United States Patent
Cordeiro et al.

(10) Patent No.: US 8,089,947 B2
(45) Date of Patent: Jan. 3, 2012

(54) SPATIAL REUSE IN DIRECTIONAL ANTENNA SYSTEMS

(75) Inventors: Carlos Cordeiro, Portland, OR (US); Guoqing Li, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 931 days.

(21) Appl. No.: 12/082,996

(22) Filed: Apr. 16, 2008

(65) Prior Publication Data

US 2009/0059890 A1 Mar. 5, 2009

Related U.S. Application Data

(60) Provisional application No. 61/035,480, filed on Mar. 11, 2008.

(51) Int. Cl.
*H04B 7/212* (2006.01)
(52) U.S. Cl. .................................. 370/348
(58) Field of Classification Search .................. 370/348
See application file for complete search history.

(56) References Cited

U.S. PATENT DOCUMENTS

| | | | | |
|---|---|---|---|---|
| 6,304,556 | B1 * | 10/2001 | Haas | 370/254 |
| 7,248,841 | B2 * | 7/2007 | Agee et al. | 455/101 |
| 7,519,013 | B2 * | 4/2009 | Destino et al. | 370/310 |
| 2002/0150182 | A1 * | 10/2002 | Dogan et al. | 375/343 |
| 2003/0033394 | A1 * | 2/2003 | Stine | 709/222 |
| 2005/0190784 | A1 * | 9/2005 | Stine | 370/445 |
| 2006/0268760 | A1 * | 11/2006 | Fang et al. | 370/328 |
| 2008/0062939 | A1 * | 3/2008 | Horn et al. | 370/338 |
| 2009/0003259 | A1 * | 1/2009 | Sundaresan et al. | 370/315 |

OTHER PUBLICATIONS

Cordeiro, "Antenna Training and Tracking Protocol (ATTP)", U.S. Appl. No. 60/969,505, Aug. 31, 2007.

* cited by examiner

*Primary Examiner* — Kenny Lin
(74) *Attorney, Agent, or Firm* — Trop, Pruner & Hu, P.C.

(57) ABSTRACT

In directional antennas, spatial reuse involves enabling two communications to occur on the same link at the same time. The communications may be in the same or opposite directions. If no link of sufficient bandwidth is available that does not already have an active communication, a link with an active communication of sufficient bandwidth is located. Then an antenna training sequence may be implemented. A check determines whether the antenna training sequence was successful. If there was interference during the antenna training sequence, then the spatial reuse is not permitted. Otherwise, spatial reuse may be permitted.

16 Claims, 2 Drawing Sheets

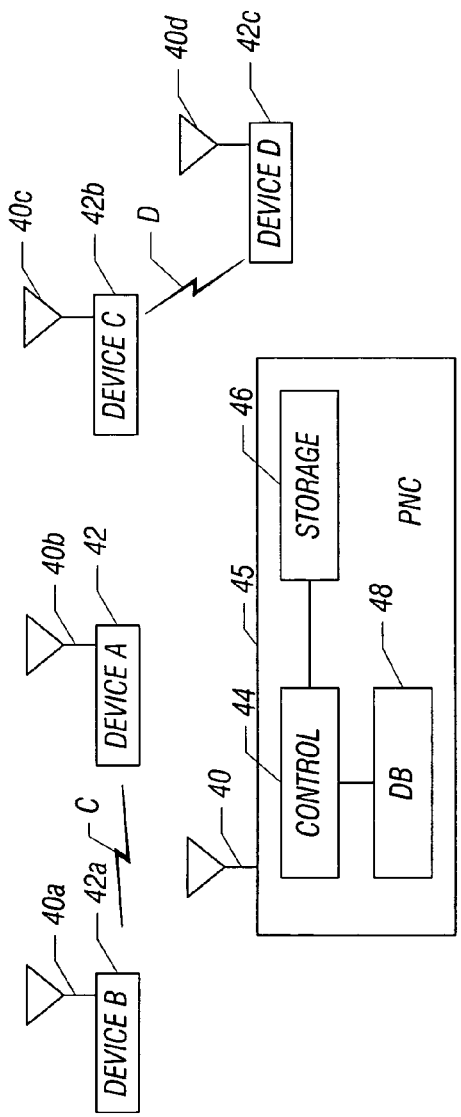
FIG. 1
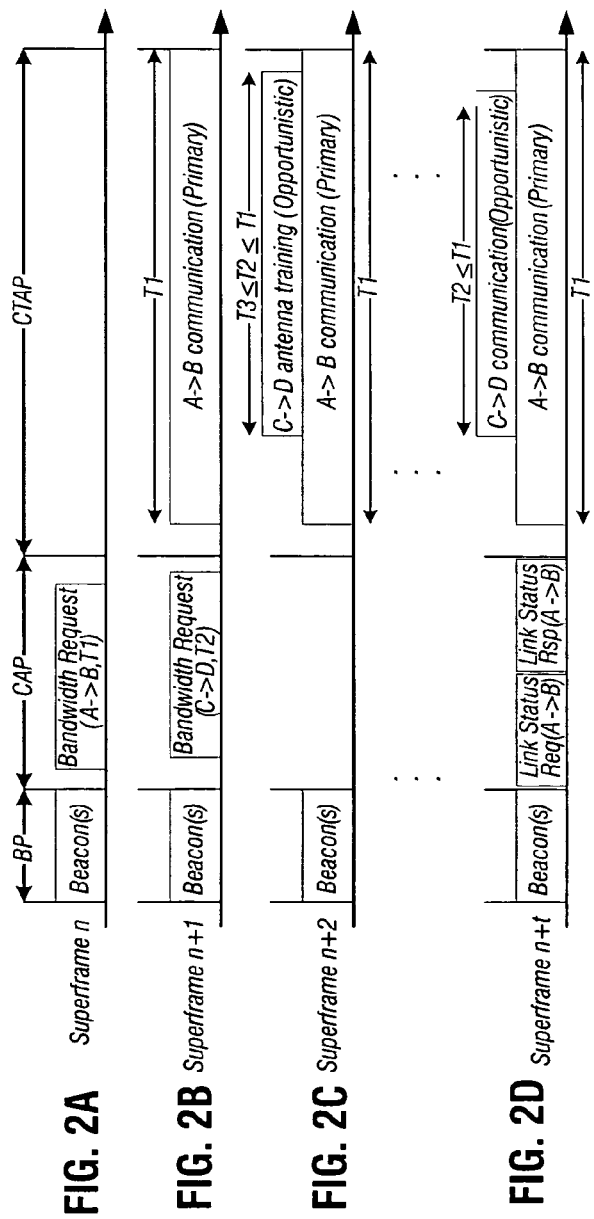
FIG. 2A Superframe n
FIG. 2B Superframe n+1
FIG. 2C Superframe n+2
FIG. 2D Superframe n+t

SPATIAL REUSE IN DIRECTIONAL ANTENNA SYSTEMS

RELATED APPLICATION

This application claims the benefit under 35 U.S.C. §119 (e) to U.S. Provisional Patent Application No. 61/035,480, filed Mar. 11, 2008 and is hereby incorporated by reference in its entirety.

BACKGROUND

This relates generally to directional antennas that radiate radio waves more effectively in some directions than in other directions.

Spatial reuse allows two or more communication links to simultaneously operate over the same channel within the same neighborhood. Generally, efficient spatial reuse is only possible with directional, as opposed to omnidirectional, antennas. Thus, two spaced devices may communicate in forward and reverse directions over the same channel, at the same time, within the same radio coverage range.

One application for direction antenna systems is in connection with wireless personal area networks (WPANs). A WPAN is a network for interconnecting devices centered around an individual person's work space in which the connections are wireless. For example, a WPAN may interconnect ordinary computing and communicating devices that many people have at their work place or it might serve a more specialized purpose, allowing a number of team members to communicate during a work task.

In some embodiments, the spatial reuse may be integrated with the antenna training stream for high performance. It may be used in both intra and inter piconet spatial reuse. The spatial reuse is triggered upon establishment of a new link and, therefore, it may be called a reactive or on demand system.

BRIEF DESCRIPTION OF THE DRAWINGS

FIG. 1 is a schematic depiction of a wireless network according to one embodiment;

FIGS. 2A-D are communication sequences according to one embodiment; and

DETAILED DESCRIPTION

Figure 3:
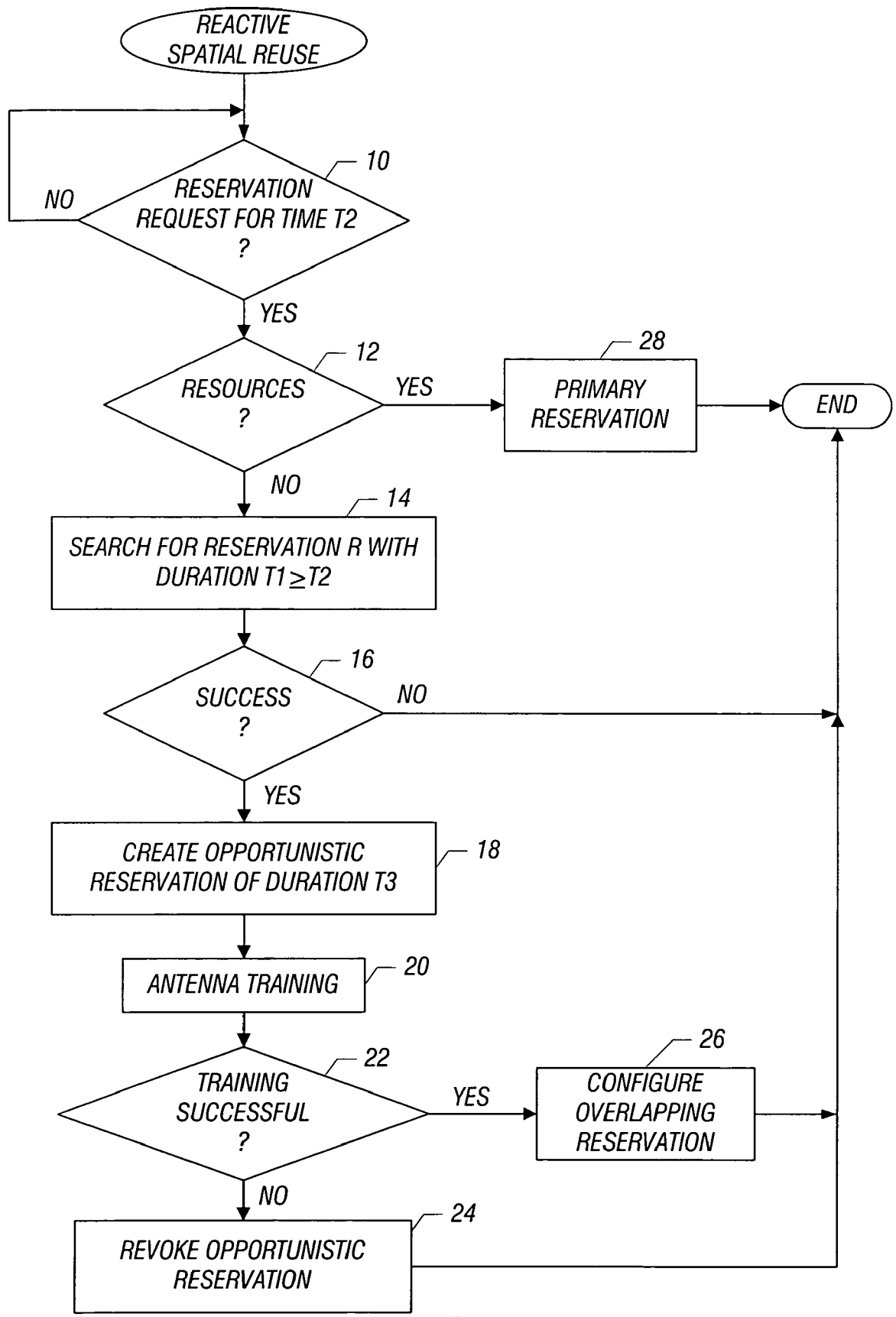
FIG. 3 is a flow chart for one embodiment.

Referring to FIG. 1, a wireless network, such as a piconet, may include at least three devices, including the device 42, the device 42a, and a piconet coordinator (PNC) 45. In one embodiment, the wireless network is a wireless personal area network.

In one example, the $n^{th}$ superframe used in the network is depicted in FIG. 2A. On this superframe, the device 42 transmits a bandwidth request packet to the PNC 45 requesting to establish a link with duration T1 to device 42a. Since wireless resources are available, the PNC 45 allocates time within the next superframe for the link between devices 42 and 42a. This allocation of time is announced on the PNC's beacon in a beacon period (BP) in the next superframe, as shown in FIG. 2B. The devices 42 and 42a can then perform antenna training or beamforming and can proceed with actual data transmissions without any restrictions.

Directional high-gain antennas or antenna arrays are often used to support spatial reuse and provide adequate link budget and high data rate transmissions. In addition, many applications operate under potentially non-line-of-sight (NLOS) channels and quick adaptation to changing environments such as moving objects. Hence, an adaptive beamforming and beam-steering protocol may allow radios to establish a high-gain, directional LOS or NLOS beam between the transmitting and receiving stations. This process is referred to as antenna training (or beamforming).

Superframes later in the same example, the device 42b transmits a bandwidth request packet during a contention access period (CAP) to the PNC 45 to establish a link with device 42c for duration T2, as also shown in FIG. 2B. The PNC 45 then determines that the superframe can no longer accommodate all the requested links. At this time, a spatial reuse scheme is triggered.

In the spatial reuse scheme, the PNC 45 goes through its current superframe reservations in search of a primary reservation R whose duration T1 is greater than or equal to T2 during a channel time allocation period (CTAP). Alternatively, the PNC 45 may combine reservations such that the total time T1 is greater than or equal to T2.

The bandwidth request from device 42b is denied if the PNC 45 cannot find suitable reservations for this procedure. Otherwise, the PNC 45 creates an opportunistic (or secondary) reservation, as indicated in FIG. 2C, of duration T3, where T3 is less than or equal to T2, which is less than or equal to T1, over the primary reservation R.

During the time T3, the devices 42b and 42c will initiate antenna training in a sharing or non-sharing mode described later and illustrated in FIG. 2C.

The antenna training can be done in a sharing or non-sharing mode. In a sharing mode, a clear channel assessment (CCA), such as energy or preamble detection, is performed before every transmission of a training sequence through a given direction. If a clear channel assessment is positive, because no signal is detected over a particular direction, a training sequence transmission is carried out normally in that particular direction.

Otherwise, if the clear channel assessment is negative because a signal is detected, the training sequence transmission is skipped. By skipping a direction, a node is implicitly disallowing this link to operate over this direction, avoiding interference with other ongoing links. Even when a direction is skipped, the antenna training algorithm compensates by delaying the antenna training process by an amount equivalent to the transmission of the training sequence. As a result, skipping a particular direction becomes transparent to the receiver and to the training algorithm.

Of course, it is not only the transmitter node that performs antenna training in sharing and non-sharing modes. The receiver can also perform the same procedure. Antenna training is a process that involves both of the transmitter and receiver of a link. By using both the transmitter and the receiver, the robustness of this reactive spatial reuse scheme may be improved, promoting a higher degree of spatial reusability in some embodiments.

The devices 42b and 42d then initiate antenna training in a sharing mode during the opportunistic reservation shown in FIG. 2C. Even when the antenna training is done in sharing mode, there is a possibility that the devices 42b and 42c transmit a training sequence in a particular direction that may interfere with an ongoing transmission. In such case, the PNC 45 can periodically probe the devices participating in the primary reservation (devices 42 and 42a in this example) for their link status. This is shown in FIG. 2D in connection with superframe n+t. The PNC 45 sends a link status request to the devices 42 and 42a, which can then each send a link status response as indicated.

Alternatively, the devices 42 and 42a can send an unsolicited link status response to the PNC 45. Through this link status notification procedure, the PNC 45 keeps abreast of, say, the packet error rate, signal-to-interference noise ratio (SINR), etc., of the primary reservation and determines whether it will allow an opportunistic reservation to proceed over the next superframe or not.

Once the antenna training process of the opportunistic reservation comes to an end, the devices 42b and 42c inform the PNC 45 whether they were able to successfully beamform, or find a path toward each other, with adequate link quality. Also, the devices 42 and 42a can report to the PNC 45 their link status information during the CAP. If the beamforming between the devices 42b and 42c was successful and the devices 42 and 42a were not impacted during the process, the PNC 45 can safely confirm the opportunistic reservation between the devices 42b and 42c during the primary reservation R between the devices 42 and 42a, as indicated in FIG. 2D. Otherwise, if either the beam-forming was not successful or the communication C between the devices 42 and 42a was negatively impacted, the PNC 45 revokes the opportunistic reservation for the devices 42b and 42c.

Once an opportunistic reservation is confirmed by the PNC 45, actual data communication between the devices can commence. While both the primary and the opportunistic reservations are active, the PNC 45 can continuously monitor the link status of the primary reservation. Periodic link status updates allow the PNC 45 to determine whether it is safe to allow opportunistic reservations to proceed or not.

A reactive scheme can also be applied for spatial use across piconets, even though the scenario described above was for a single piconet. If increased spatial reuse among piconets is desirable, the PNC 45 can always require devices to perform antenna training in a sharing mode. In this way, inter-piconet spatial reuse can also be accomplished in embodiments where CCA is always employed.

While the scheme has been described in connection with a centralized medium access control (MAC) architecture, the same principles can be applied in distributed medium access control environments. All that is required is for the devices to perform antenna training in a sharing mode and also to make the link status notifications and beacon frames during the beacon period.

Referring to FIG. 3, in some embodiments, the reactive spatial reuse may be implemented using hardware, software, or firmware. In cases where the spatial reuse is implemented in software, a computer readable medium may be used to store the software. The computer readable medium may be the storage 46 in FIG. 1 that may, for example, be a semiconductor memory or an optical or magnetic storage device, to mention a few examples.

Referring to FIG. 3, initially a check at diamond 10 determines whether there is a reservation request for a time T2. If the device 42 needs to establish a new link with a device 42a, it makes a reservation request to the PNC 45 for the time T2. A check at diamond 12 determines if resources are available. If not, a search is implemented for reservations R, with duration T1 greater than T2, as indicated at block 14. The PNC 45 searches its ongoing reservations in search for reservations R, for which its duration T1 is greater than or equal to T2. Alternatively, the PNC may combine reservations such that the total time T1 is greater than or equal to T2.

The reservation request from the device 42 is denied if a reservation is not found and the process is aborted. Otherwise, the PNC 45 creates an opportunistic reservation of duration T3, which is less than or equal to T2 and T2 is less than or equal to T1 over reservation R, during which the devices 42 and 42a initiate antenna training in sharing mode.

Thus, if a successful search results, then the opportunistic reservation of duration T3 is undertaken, as indicated in block 18. Next, antenna training occurs, as indicated in block 20.

Thereafter, the devices 42 and 42a perform antenna training. In a sharing mode, before a training sequence transmission in a particular direction, a directional clear channel assessment is performed. If the signal is detected, the training sequence transmission is skipped. Otherwise, the training sequence is transmitted in that particular direction.

If the training is successful, as determined in diamond 22, an overlapping reservation is configured in block 26. Otherwise, the opportunistic reservation is revoked, as indicated in block 24.

In a non-sharing mode, antenna training is carried out without constraints and without using CCA.

In the case of an opportunistic reservation, during or at the antenna training, the devices 42 and 42a notify the PNC 45 whether or not the antenna training was successful. The source and sink of the primary reservation notify the PNC 45 that they experienced interference. If the training is successful, the PNC 45 can safely confirm the overlapping reservation between the devices 42 and 42a during reservation R. Otherwise, the PNC 45 revokes the opportunistic reservation.

In the case of the yes prong at the detection of resources at diamond 12, indicating that resources are available, the PNC 45 makes a primary reservation for the devices 42 and 42a to perform antenna training if needed, in either sharing or non-sharing mode. Then the data transmission is continued.

Some embodiments may be compliant with the Wireless Personal Area Network Standard IEEE 802.15.3, Telecommunications and Information Exchange between Systems available for IEEE New York, N.Y. 10016.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

determining whether to allow spatial reuse in a directional antenna system upon receipt of a request for a communication between two devices;

determining, in response to said request, whether bandwidth exists for a communication in a given time period;

providing a primary reservation in response to said request if an available channel has resources available; and if there is no available channel time of sufficient length without communications, finding a channel with sufficient duration with only one active communication.

2. The method of claim 1 including creating a second reservation on a channel with another ongoing communication, where the primary and second reservations are time overlapping.

3. The method of claim 2 including performing antenna training on a link after providing the second reservation on the channel.

4. The method of claim 3 including determining whether the training was successful.

5. The method of claim 4 including determining whether the training was successful based at least in part on whether there was interference between devices on the same link.

6. The method of claim 5 including revoking the second reservation if the training was not successful.

7. The method of claim 5 including allowing spatial reuse by two communications on the same channel if training was successful.

8. The method of claim 1 receiving a report of a link quality change and determining whether to continue spatial reuse based on said quality change.

9. A wireless device comprising:
a processor to determine whether to allow spatial reuse upon receipt of a request for a communication between two devices, said processor to determine, in response to said request, whether bandwidth exists for a communication in a given time period, said processor to provide a primary reservation in response to said request if an available channel has resources available, and said processor to find a channel with sufficient duration with only one act of communication if there is no available channel of sufficient length without communications; and
a directional antenna coupled to said processor.

10. The device of claim 9, said processor to create a second reservation in a channel with another ongoing communication, where the primary and second reservations are time overlapping.

11. The device of claim 10, said processor to antenna train on a link after providing the second reservation on the channel.

12. The device of claim 11, said processor to determine whether the training was successful.

13. The device of claim 12, said processor to determine whether the training was successful based, at least in part, on whether there was interference between devices on the same link.

14. The device of claim 13, said processor to revoke the second reservation if the training was not successful.

15. The device of claim 13, said processor to allow spatial reuse by two communications on the same channel if training was successful.

16. The device of claim 9, said processor to use a report of a link quality change to determine whether to continue spatial reuse.

* * * * *